(12) United States Patent
Grevener et al.

(10) Patent No.: US 9,352,794 B2
(45) Date of Patent: May 31, 2016

(54) METHOD FOR ASSEMBLING MOTOR VEHICLES

(75) Inventors: Christoph Grevener, Gechingen (DE);
Uwe Habisreitinger, Freudenstadt (DE);
Andreas Krevet, Ehningen (DE);
Matthias Mueller, Altensteig (DE);
Thomas Stark, Tuebingen (DE);
Konrad Wirth, Tiefenbronn (DE);
Michael Zuern, Sindelfingen (DE)

(73) Assignee: Daimler AG, Stuttgart (DE)

( * ) Notice: Subject to any disclaimer, the term of this patent is extended or adjusted under 35 U.S.C. 154(b) by 286 days.

(21) Appl. No.: 13/996,811

(22) PCT Filed: Oct. 27, 2011

(86) PCT No.: PCT/EP2011/005429
§ 371 (c)(1),
(2), (4) Date: Sep. 10, 2013

(87) PCT Pub. No.: WO2012/084085
PCT Pub. Date: Jun. 28, 2012

(65) Prior Publication Data
US 2014/0082918 A1    Mar. 27, 2014

(30) Foreign Application Priority Data
Dec. 23, 2010 (DE) .......................... 10 2010 055 941

(51) Int. Cl.
*B62D 65/04* (2006.01)
*B62D 25/20* (2006.01)
*B62D 65/10* (2006.01)
(Continued)

(52) U.S. Cl.
CPC ............ *B62D 65/04* (2013.01); *B62D 25/2009* (2013.01); *B62D 65/10* (2013.01); *B65D 65/12* (2013.01); *B62D 24/00* (2013.01); *Y10T 29/49622* (2015.01); *Y10T 29/49828* (2015.01);
(Continued)

(58) Field of Classification Search
CPC .... B65D 65/04; B65D 25/2009; B65D 65/10; B65D 65/12; B65D 24/00; Y10T 29/49622; Y10T 29/49829; Y10T 29/49828; Y10T 29/49904
See application file for complete search history.

(56) References Cited

U.S. PATENT DOCUMENTS 4,730,870 A * 3/1988 DeRees .................... 296/193.04
4,991,282 A    2/1991 Konig
6,324,749 B1   12/2001 Katsuura et al.

FOREIGN PATENT DOCUMENTS

CN    1436683 A     8/2003
DE    36 03 709 A1  8/1987
(Continued)

OTHER PUBLICATIONS

Chinese Office Action dated Feb. 2, 2015, English translation only (four (4) pages).
(Continued)

*Primary Examiner* — John C Hong
(74) *Attorney, Agent, or Firm* — Crowell & Moring LLP

(57) ABSTRACT

A method for assembling motor vehicles in which a drive train, chassis and floor module are pre-assembled and then connected to a shell of the motor vehicle. The floor module is pre-assembled in a first pre-assembly process and the drive train and the chassis are pre-assembled in a second pre-assembly process. The floor module, the drive train and the chassis are combined and then connected to the shell of the motor vehicle.

6 Claims, 5 Drawing Sheets

Figure 1:
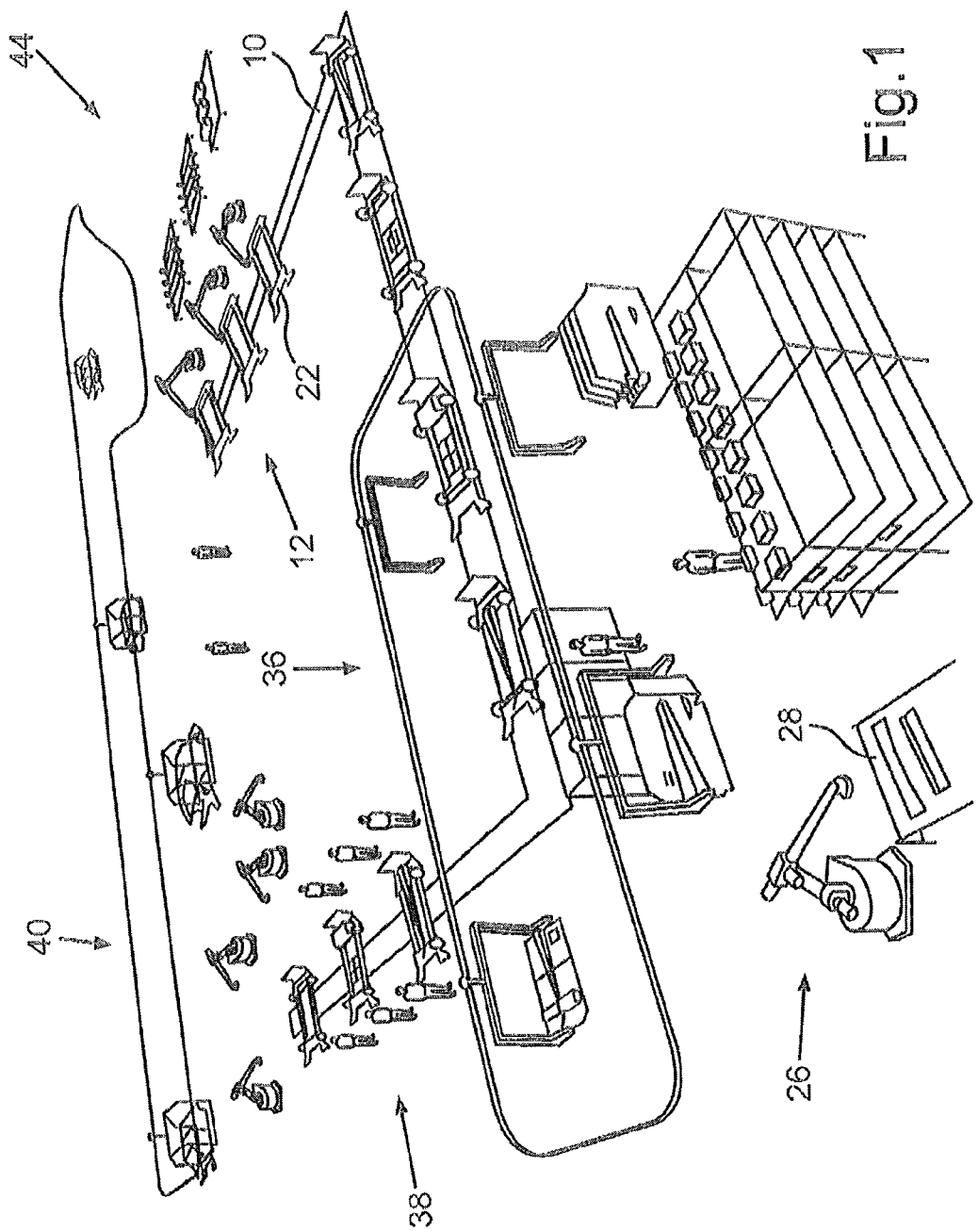

(51) Int. Cl.
  *B65D 65/12* (2006.01)
  *B62D 24/00* (2006.01)

(52) U.S. Cl.
  CPC ...... *Y10T 29/49829* (2015.01); *Y10T 29/49904* (2015.01)

(56) References Cited

FOREIGN PATENT DOCUMENTS

| | | |
|---|---|---|
| DE | 37 07 684 A1 | 9/1987 |
| DE | 37 02 619 A1 | 8/1988 |
| DE | 101 54 353 A1 | 5/2002 |
| DE | 10 2007 047 037 A1 | 4/2009 |
| EP | 0 171 576 A1 | 2/1986 |
| EP | 1 016 586 A1 | 7/2000 |
| JP | 63-265786 A | 11/1988 |
| JP | 7-172361 A | 7/1995 |
| JP | 2004-90924 A | 3/2004 |

OTHER PUBLICATIONS

Japanese Office Action dated Jul. 15, 2014 with partial translation (Five (5) pages).
International Search Report dated Jan. 11, 2012, including English translation (eight (8) pages).
German-language Written Opinion (PCT/ISA/237) (seven (7) pages).
German-language European Search Report issued in European counterpart application No. 11 776 370.6-1760 dated Feb. 8, 2016 (Six (6) pages).

* cited by examiner

METHOD FOR ASSEMBLING MOTOR VEHICLES

BACKGROUND AND SUMMARY OF THE INVENTION

Exemplary embodiments of the present invention relate to a method for assembling motor vehicles.

European patent document EP 0 171 576 A1 discloses a method for the assembly of motor vehicles in which a floor module in the form of a load-bearing chassis is provided, onto which a non-load-bearing structure is placed. The load-bearing floor module having a frame is thus equipped with several seating units as well as a drive train and a chassis, before the structure is placed onto the floor module.

It is generally known from the series construction of motor vehicles, which, by contrast with the motor vehicle according to European patent document EP 0 171 576 A1, typically have a shell or a body in self-supporting design, to prefabricate the drive train and the chassis and assemble them on a driverless transport system. Parallel to this, the shell of the motor vehicle is typically provided with an interior installation in a main assembly line, after which the shell is connected to the drive train and the chassis in line with the so-called marriage.

Furthermore, German patent document DE 37 07 684 A1 discloses a module construction for a vehicle having several individual modules, wherein a base platform is used as a module. Here, the vehicle only has the desired properties for a vehicle body, such as crash resistance and carrying capacity, after assembly, since each individual module contributes to the carrying capacity of the entire vehicle.

Furthermore, German patent document DE 10 2007 047 037 A1 discloses a motor vehicle body, wherein the rear section of the body is configured in such a way that one or more cross-members with structural units arranged modularly thereon can be incorporated into the body according to the currently desired equipment.

Moreover, German patent document DE 101 54 353 A1 discloses a modular vehicle construction, wherein the vehicle chassis has a frame, to which a shell for receiving an energy source to drive a drive system is connected.

Overall, the problem arises in the series construction of personal motor vehicles that, at this stage, a plurality of vehicle variants arises, in particular due to the fact that different drive concepts are offered. Drive concepts are to be understood as, in particular, various drive systems for the motor vehicle, which use different energy sources, so, for example, combustion engines, gas engines, electric engines, fuel cell drives or hybrid drives.

In the current process for assembling motor vehicles, this requires that many assembly steps, which are accordingly different as a result of the different variants, must be carried out within the main assembly line.

Exemplary embodiments of the present invention provide a method for the assembly of motor vehicles by means of which a simplified assembly can be implemented, in particular with the main assembly line.

To create a method of the type cited above, by means of which the assembly of the motor vehicles within the main assembly line is considerably simplified, provision is made according to the invention for the floor module to be pre-assembled in a first pre-assembly process along a separate pre-assembly line and for the drive train and the chassis to be pre-assembled in a second pre-assembly process along a further, separate pre-assembly line, whereupon the floor module, the drive train and the chassis are combined in an assembly region and then connected to the shell of the motor vehicle, wherein constructional units of the floor module, the drive train and the chassis are connected to one another after the combining before being introduced into the shell. In other words, provision is made according to the invention to pre-assemble the floor module on one side and the drive train and chassis on the other, to combine these and then to arrange them on the shell of the motor vehicle. Furthermore, constructional units of the floor module, the drive train and the chassis are connected to one another after the combining within the so-called engagement. In other words, provision is preferably made for the floor module on one side and the chassis and drive train on the other to be connected with respect to one another after the engagement in such a way that these are already in an operative connection with respect to one another at least to the greatest extent possible before the connection to the shell of the motor vehicle—the so-called marriage.

Indeed, the floor module, the drive train and the chassis are subjected to a considerable variance as a result of the different drive variants of the motor vehicle, which can be counteracted particularly favorably by carrying out corresponding pre-assembly processes. Thus, for example, the floor module can be equipped with corresponding equipment with a plurality of variant-specific constructional units, which, for example, are delivered sequentially, in order that there is an optimal adjustment to the drive concept in the pre-assembly. The same applies for the unit of drive train and chassis that can be pre-assembled, which likewise can have a plurality of sequenced constructional units, which are provided and pre-assembled depending on the drive concept of the corresponding motor vehicle.

In line with the engagement, the floor module on one side and the drive train and chassis on the other can then be combined together outside the main assembly line, such that, with respect to this, the main assembly line can be freed of variants at least to the greatest extent possible and thus can be streamlined. As a result of this, a drive-neutral shell arises, which has a particularly advantageous effect on the times and costs of assembly.

Furthermore, due to this method, the expenditure for achieving pearl-necklace-related logistics required for the respective assembly line is considerably reduced.

In a further embodiment of the invention, the chassis and the drive train are, within the corresponding second pre-assembly process, preferably pre-assembled on an auxiliary carrier, which, for example, can be designed as a so-called assembly skid. The chassis and the drive train can be prepared particularly advantageously on this auxiliary carrier for the engagement with the floor module.

A further advantageous embodiment provides that the floor module is placed on the auxiliary carrier. There thus arises a particularly simple and easy-to-assemble connection of the floor module to the drive train and the chassis.

Here, in a further embodiment of the invention, it has been shown to be advantageous if a function test of respective constructional units is carried out after the floor module, the drive train and the chassis have been combined in line with the engagement. Thus, a completion and testing of the components involved can take place before the marriage with the shell of the motor vehicle, which in turn streamlines the main assembly line even further. After the engagement, corresponding working materials can also already be filled in or energy storage devices can be supplied accordingly, such that, in particular, the drive train and the steering and the brakes are already in a state of operational readiness. This provides the advantage that the shell can, if necessary, be made to be ready-to-drive in a simple manner after the combining in line with the marriage, so as to at least partially dispense with external conveyance and transportation technology.

In this way, an extensive function test can be carried out on the vehicles and the components used at a very early point in time before the vehicles reach the main assembly line. Errors and functional defects can be detected and dealt with in a timely manner. Furthermore, consequential defects occurring later can thus be prevented. This contributes to a high level of manufacturing quality.

BRIEF DESCRIPTION OF THE DRAWING FIGURES

Figure 2:
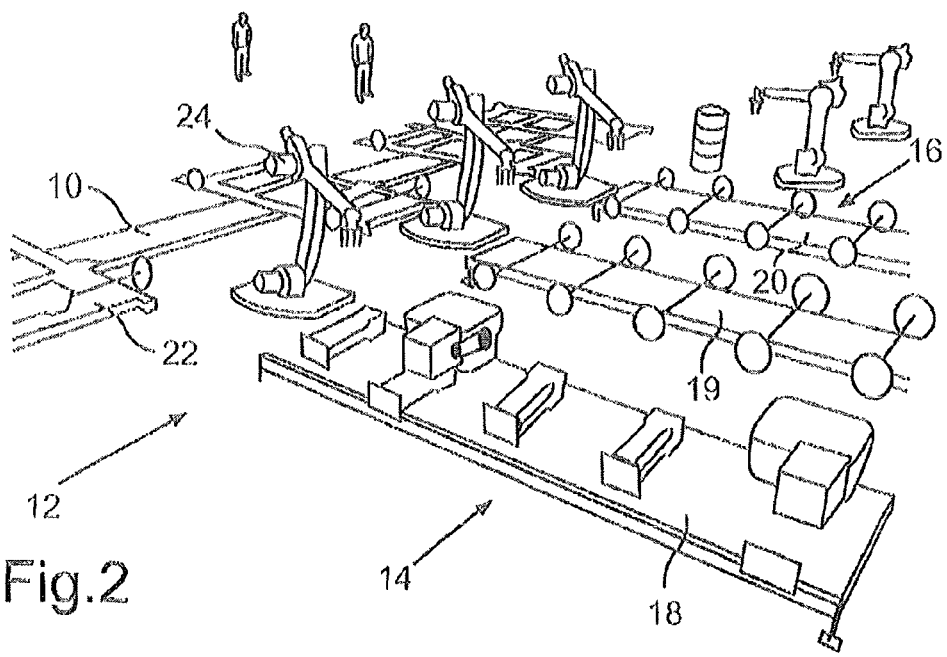
Figure 3:
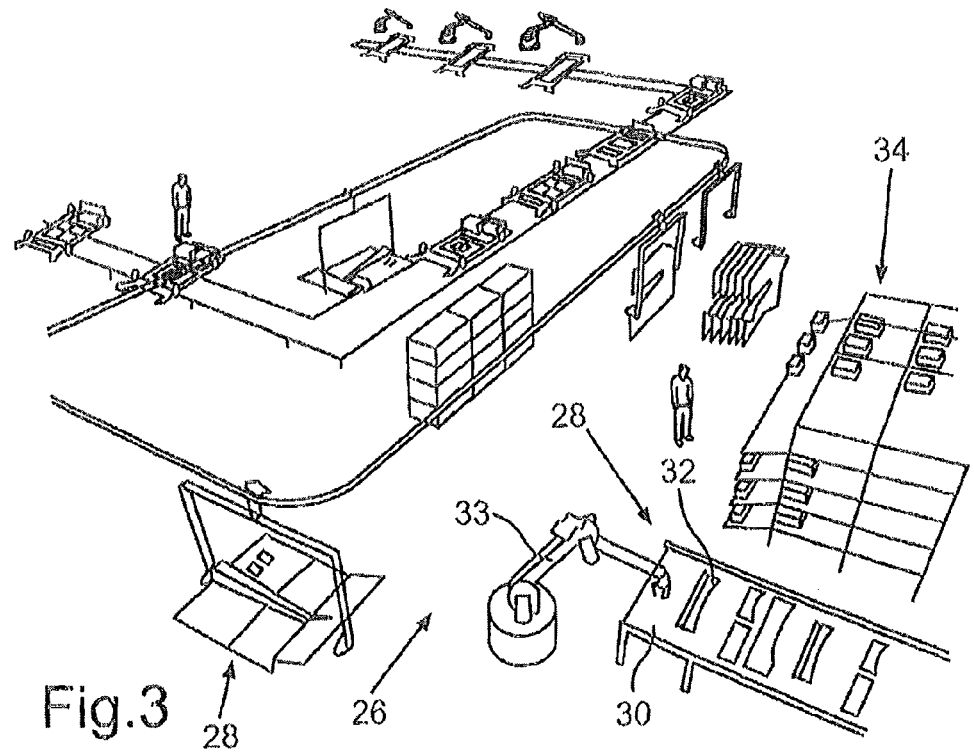
Figure 4:
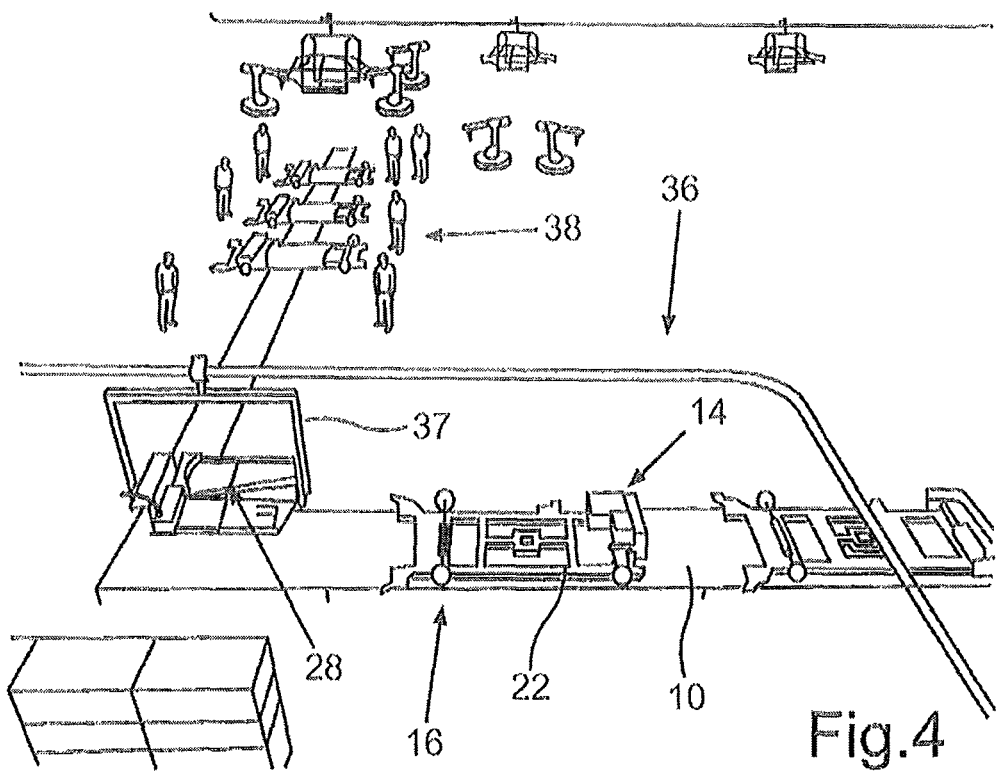
Figure 5:
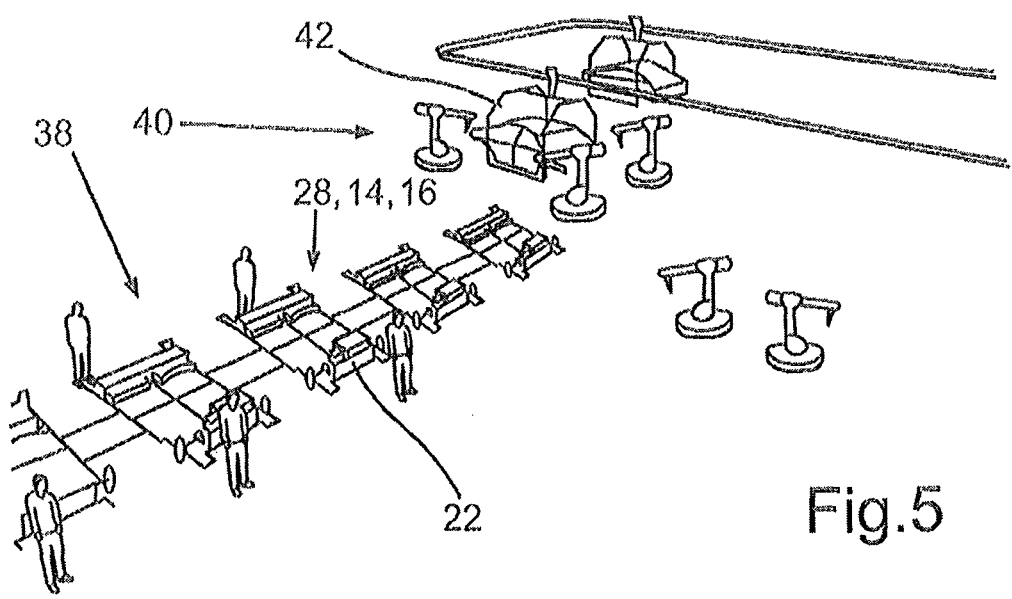
Figure 6:
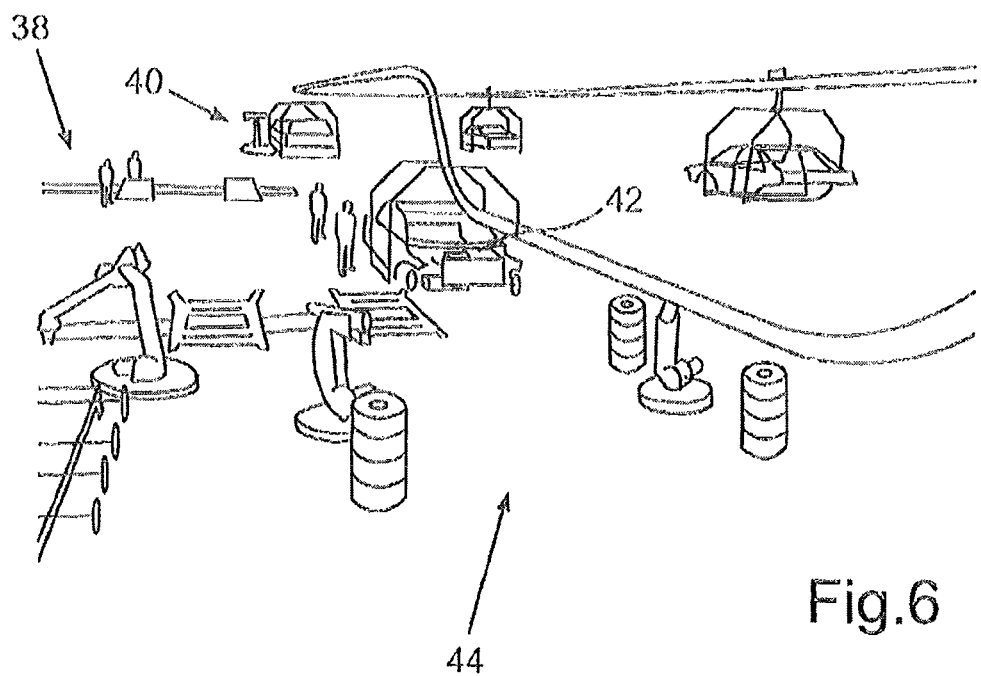
Figure 7:
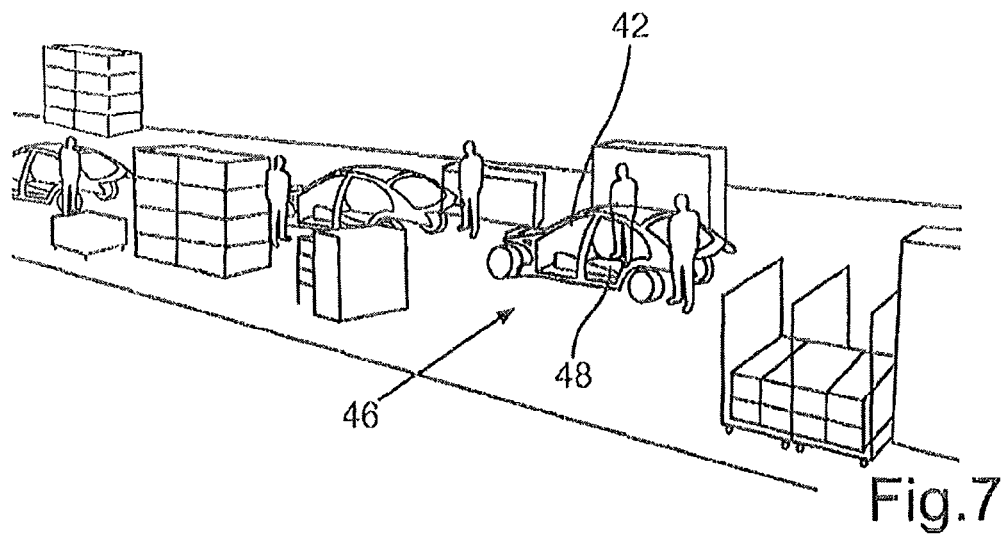
Figure 8:
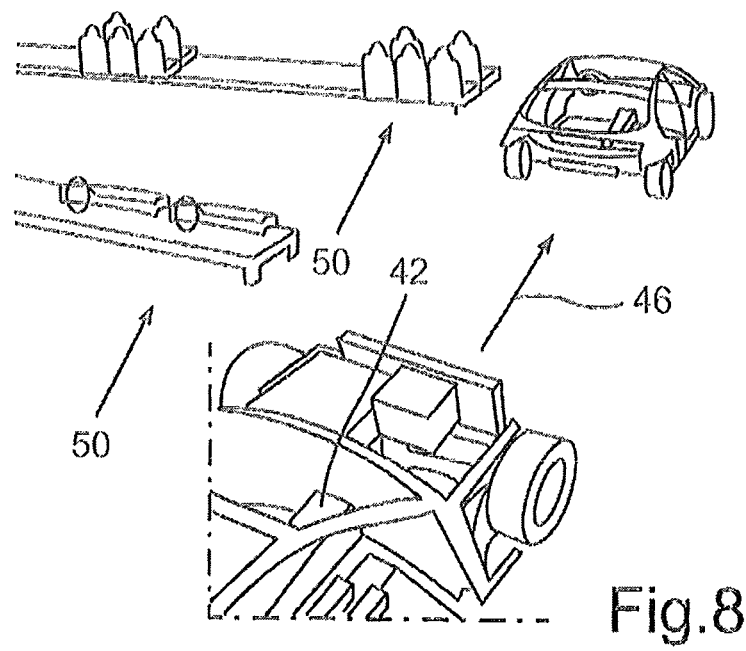
Figure 9:
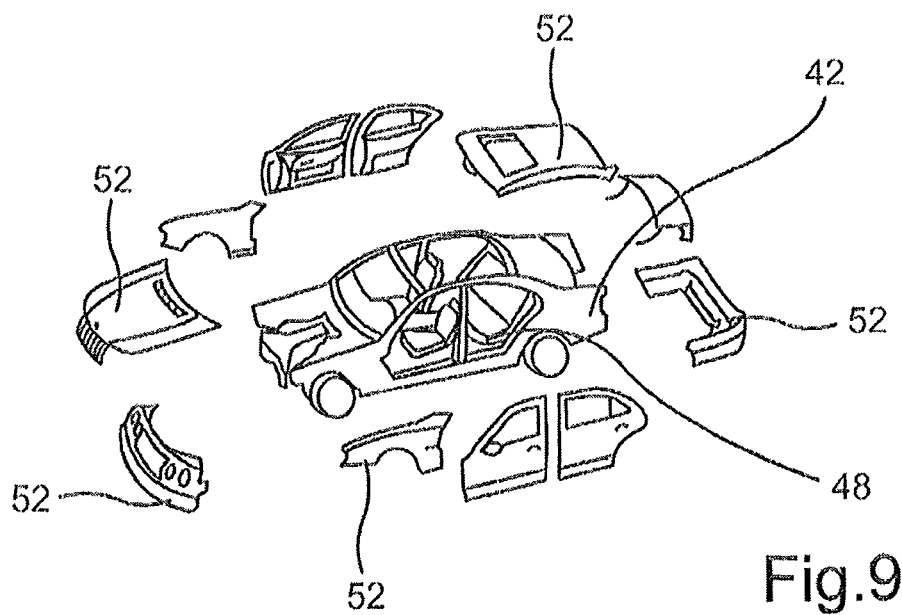

Further advantages, features and details of the invention arise from the following description of a preferred exemplary embodiment and by reference to the drawings; the following are shown:

FIG. 1 a schematic perspective view onto an assembly line for the pre-assembly of a respective chassis and a respective drive train of the corresponding motor vehicle, as well as a floor module of the respective motor vehicle, which are connected to one another in line with a so-called "engagement" and pre-assembled before these are connected to a respective corresponding shell of the corresponding motor vehicle in line with a so-called "marriage", wherein the motor vehicle is equipped with wheels after the marriage;

FIG. 2 a schematic perspective view onto the pre-assembly of the drive train and of the chassis within the assembly line shown in the FIG. 1;

FIG. 3 a schematic perspective view onto a pre-assembly of the floor module within the assembly line according to FIG. 1;

FIG. 4 a schematic perspective view onto the engagement of the chassis and the drive train with the respective floor module within the assembly line according to FIG. 1;

FIG. 5 a schematic perspective view onto the marriage of the respective shell of the motor vehicle with the respective chassis and drive train or the respective floor module within the assembly line according to FIG. 1;

FIG. 6 a schematic perspective view onto an assembly station of the assembly line according to FIG. 1 after the marriage, within which the motor vehicle is equipped with the vehicle wheels;

FIG. 7 a schematic perspective view onto assembly stations of a main assembly line located downstream of the assembly line according to FIG. 1, in which the respective shell of the motor vehicle is equipped with the interior installation;

FIG. 8 a further sectional perspective view onto respective assembly stations of the main assembly line, within which respective constructional units and components of the interior installation are provided for the assembly; and FIG. 9 a perspective view onto the respective shell of the motor vehicle, which has the chassis, drive train and interior installation added to it, which, in connection to the interior installation, has the elements forming the outer skin added to it.

DETAILED DESCRIPTION

In FIG. 1 illustrates in a schematic perspective view, an assembly line arranged upstream of a main assembly line (to be illustrated in greater detail) for the assembly of motor vehicles. This assembly line 10 is to be furthermore illustrated in detail in conjunction with FIGS. 2 to 6.

First, in conjunction with FIG. 2, a first region 12 of the assembly line 10 can be seen, which shows the pre-assembly of a respective drive train 14 and a respective chassis 16 in a pre-assembly process of the corresponding motor vehicle. Here, FIG. 2 shows the region 12 in a schematic and sectional perspective view.

As can be seen from FIG. 2, the region 12 of the assembly line 10 comprises a supply device 18 for a respective different drive or drive train 14, which is provided depending on the respective drive concept of the motor vehicle. Respective supply devices 19, 20 for a front axle or rear axle of the respective chassis 16 can be seen behind the supply device 18 for the respective drive or drive train 14. Moreover, further chassis elements or components can be provided as well as the front and rear axle.

As can now be seen from FIG. 2, the individual components of the drive train 14 and the chassis 16 are arranged on a respective auxiliary carrier 22, which is conveyed on the assembly line 10. This takes place by means of corresponding robots 24.

The respective components of the drive train 14 and the chassis 16 are provided in sequence on the supply devices 18 to 20 and positioned on the respective auxiliary carrier 22, which is allocated to a motor vehicle that is to be produced accordingly. The sequential arrangement and selection of the individual components of the drive train 14 and the chassis 16 in the pre-assembly process thus take place depending on a respective drive concept of the motor vehicle.

In conjunction with FIG. 3, which in particular shows a second region 26 of the assembly line 10 in a further sectional and schematic perspective view, the pre-assembly of a floor module 28 in a further pre-assembly process becomes clear. This floor module 28 comprises a floor shell 30, on which a plurality of constructional units 32 can be arranged as equipment. These constructional units 32 are variant-specific or variant-dependent on the respective drive concept of the corresponding motor vehicle. Here, both individual components and constructional elements can be understood to be constructional units, as well as assemblies or structural groups. It is possible, for example, to also add heat shields, hydraulic lines or fuel lines to the floor shell 30, as well as air lines or the like. It is also possible to add corresponding drive-concept-conditional energy storage devices, for example a tank, a battery or suchlike, to the floor shell 30. Corresponding control devices, which are required depending on the corresponding drive concept of the motor vehicle, can also be applied to the floor shell 30. Electrical constructional units 32, such as cable harnesses, in particular the main cable harness, can also be fastened to the floor shell 30 in order to hereby complete the floor module 28.

The individual constructional units 32 are hereby applied to the floor shell 30, for example, by means of a robot 33. In the present case, a shelf 34 is depicted, on which the constructional units 32 are provided, for example, in sequence.

Overall, it can thus be seen that two separate pre-assembly processes take place; namely a first pre-assembly process for producing the floor module 28 and a second pre-assembly process for pre-assembling the drive train 14 and the chassis 18. This second pre-assembly process takes place on the auxiliary carrier 22 in the form of an assembly skid. Here, this assembly skid passes through the pre-assembly, wherein the robot 24, according to the variant, looks for the required respective axle or other components.

In conjunction with FIG. 4, a third region 36 of the assembly line 10 is depicted in a sectional and schematic perspective view. In this third region, there takes place a so-called engagement of the drive train 14 with the chassis 16 pre-assembled in the first region 12 and the floor module 28 pre-assembled in the second region 26. Here, it can be seen that the auxiliary carrier 22 bearing the drive train 14 and the chassis 16 is introduced from below and the floor module 28 is fitted from above on the upper side via a corresponding transportation device 37. Thus, due to the engagement, there arises a pre-assembled arrangement of drive train 14, chassis 16 and floor module 28, which is attuned to the respective variant of the motor vehicle or to the respective drive concept of the motor vehicle.

Moreover, in FIG. 4, further assembly stations 38 can be seen, within which, for example, a connection of the corresponding components and constructional units 32 of the drive train 14, the chassis 16, and the floor module 28 takes place. As well as the connection of the individual components and constructional units 32, lines or energy storages devices such as tanks, for example, can be filled. Moreover, electrical control devices, for example, can be activated. After the engagement, the individual components or constructional units 32 are thus preferably ready for operation.

Alongside the completion, a function test of constructional units 32 of the floor module 28, the drive train 14, and/or of the chassis 16 can also take place in the region of the assembly station 38. This has the advantage that the motor vehicle can move more or less on its own before reaching the main assembly line 46, as well as further method steps can thus be carried out outside the main assembly line 46, such that these can be kept exceedingly short despite the plurality of different drive types.

A fourth region 40 of the assembly line 10 can be seen in FIG. 5, in which a respective shell 42, in line with a so-called marriage with its respective drive train 14, chassis 16 and floor module 28, which have first been combined with one another in the third region 36 in line with the engagement, is connected. To that end, the shell 42 has a corresponding recess for the floor module 28, which is applied accordingly. The drive train 14 and the chassis 16, as well as the floor module 28, are also connected to the shell 42 of the motor vehicle. After the connection to the shell 42, the auxiliary carrier 22, which has served to bear the drive train 14, the chassis 16 and the floor module 28, is conveyed back to the first region 12. At this point, it is to be noted that the present shell 42 is a self-supporting body of a personal motor vehicle or a self-supporting structure of a motor vehicle in general.

Since, as has already been illustrated, the respective variant of the drive concept takes place by the corresponding formation of the drive train 14, the chassis 16 and the floor module 28, the shell 42 is substantially configured without variants. This means that the variation that is necessary based on the drive concept is at least substantially pre-displaced into the pre-assembly of the drive train 14, the chassis 16 and the floor module 28.

Finally, FIG. 6 shows a further assembly station 44 of the assembly line 10, wherein the motor vehicle has motor vehicle wheels added to it. This has the particular advantage that conveyance and transportation devices, which must receive and/or bear the weight of the motor vehicle, can thus be dispensed with. In fact, the vehicle can be rolled off from this assembly station 44 due to the further assembly, in particular the main assembly line that is still to be illustrated further below. This can either take place as operated by external power or by the drive of the motor vehicle itself.

FIGS. 7 and 8 show respective perspective views of a main assembly line 46, which is connected to the assembly line 10. By contrast to conventional assembly methods, equipping the shell 42 with an interior installation 48 first takes place after the marriage. This interior installation 48 in particular comprises the installation of the dashboard, the seating units, the interior trim, the central console and a plurality of further devices such as the pedals, the steering column or other further equipment. For this, FIG. 8 shows respective assembly stations 50, wherein, for example, corresponding seating units or dashboards are assembled. Moreover, FIG. 7 shows that, for example, the displacement of the shell 42 can take place in the main assembly line 46.

Finally, FIG. 9 shows the shell 42 of the motor vehicle in a schematic perspective view, wherein the interior installation 48 has already been implemented. It can be seen that, as well as the interior installation 48, the front windscreen and rear windscreen have also been adjusted.

In a further method procedure within the main assembly line 46, the shell 42 of the motor vehicle has a plurality elements 52 added to it after the interior installation 48 has been equipped, which form the outer skin of the motor vehicle. These elements can be moveable doors or hoods or flap, as well as other external covering parts such as mud guards, roof modules, front and rear-end modules or other external attachment parts. Here, the motor vehicle is preferably designed in such a way that the entire shell 42 is covered with corresponding external covering elements 52. This has the advantage that the shell 42 only has to have corrosion protection added to it before it is delivered to the marriage, and not a coating. This can be saved, since all regions are non-visible parts and are covered by the external covering elements 52.

The adjustment of functional elements of the motor vehicle can be preferably take place within the main assembly line 46, and therefore in particular to reduce the volumes in the region of the end of the main assembly line 46. Thus, for example, a chassis adjustment, a headlight adjustment or a calibration and start operation of driver assistance systems, in particular chassis assistance systems, can be displaced from the main assembly line 44 to the pre-assembly. Thus, for example, corresponding adjustments of functional elements in connection with the engagement and before or after the marriage can be monitored in the region of the pre-assembly and before the main assembly line 46. Likewise, due to the possibility for autonomous movement of the motor vehicle, it is possible for this to be moved onto corresponding chassis dynamometers or into regions for rain testing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for assembling motor vehicles, the method comprising:
    pre-assembling a drive train, a chassis and a floor module; and
    connecting the pre-assembled drive train, chassis, and floor module to a shell of the motor vehicle,
    wherein the floor module is pre-assembled in a first pre-assembly process along a separate pre-assembly line and the drive train and chassis are pre-assembled in a second pre-assembly process along a further, separate pre-assembly line,
    wherein the floor module, the drive train and the chassis are combined and then connected to the shell of the motor vehicle,
    wherein constructional units of the floor module, the drive train and the chassis are connected to one another after the combining of the floor module, drive train, and chassis and before the connecting the floor module, drive train, and chassis to the shell.

2. The method according to claim 1, wherein equipment with a plurality of variant-specific constructional units is provided on the floor module.

3. The method according to claim 1, wherein a plurality of constructional units are provided on the floor module depending on a drive concept of the corresponding motor vehicle.

4. The method according to claim 1, wherein the chassis and the drive train are pre-assembled on an auxiliary carrier before being connected to the floor module.

5. The method according to claim 4, further comprising:
placing the floor module onto the auxiliary carrier.

6. The method according to claim 1, further comprising:
performing function tests of the constructional units of the floor module, the drive train, or the chassis after the combining of the floor module, the drive train and the chassis, before a connection to the shell of the motor vehicle, and before an end of a main assembly line.

* * * * *